Oct. 28, 1947.　　　M. O. YOUNG　　　2,429,658
VALVE
Filed June 13, 1945
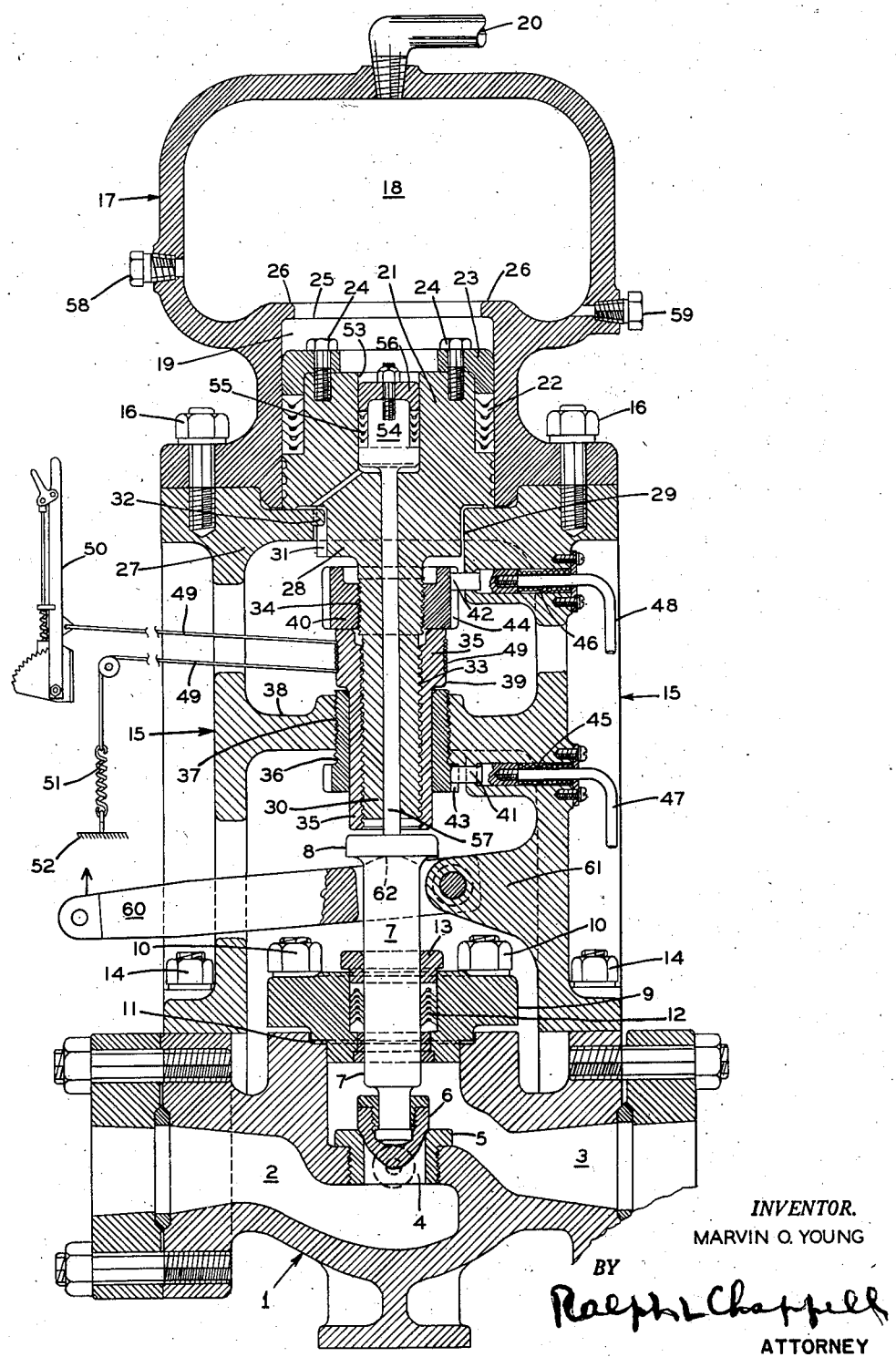
INVENTOR.
MARVIN O. YOUNG
BY
Ralph L Chappell
ATTORNEY Patented Oct. 28, 1947

2,429,658

UNITED STATES PATENT OFFICE 2,429,658

VALVE

Marvin O. Young, Media, Pa.

Application June 13, 1945, Serial No. 599,284

13 Claims. (Cl. 137—53)

(Granted under the act of March 3, 1883, as amended April 30, 1928; 370 O. G. 757)

This invention relates to new and useful improvements in valves, and more particularly, to fluid control and relief valves. Specifically, the invention relates to a novel control and relief valve especially adapted for use in the hydraulic systems of aircraft arresting gear of the type employed upon the flight decks of naval aircraft carriers.

The principal object of the present invention is to provide a novel valve structure that is operable effectively both to control fluid flow through a fluid system at normal operating pressures and to provide for the relief of excessive fluid pressures under abnormal operating conditions.

Another object of the present invention is to provide a novel valve structure of the stated character having pressure controlled means operable to limit opening of the valve element a predetermined distance to establish a condition of fluid flow through the valve at desired normal operating pressures.

Another object of the invention is to provide a novel valve structure of the character described having means to limit opening of the valve to establish fluid flow therethrough at normal operating pressures which is adjustable at will to predeterminedly vary the extent of opening of said valve.

Still another object of the invention is to provide a novel valve structure of the stated character having members operable at will to predeterminedly fix the limits and extent of adjustment means to limit opening of the valve to establish fluid flow therethrough at predetermined normal operating pressures.

A further object of the present invention is to provide a novel valve structure of the character set forth having pressure controlled means operable to limit opening of said valve for fluid flow conditions at predetermined normal operating pressures, and which is actuable at fluid pressures in excess of normal operating pressures to further open said valve and thereby relieve such excess pressures.

A further object of the invention is to provide a novel valve structure having the characteristics and features set forth wherein the adjustable means for predeterminedly limiting opening of the valve for normal pressure flow conditions therethrough may be effectively adjusted and regulated from a point or station that is relatively remote from the valve structure.

A further object of the invention is to provide a valve structure of the type described having means manually operable to open the valve to the predetermined normal fluid flow limit to effect fluid flow through the valve in a reverse direction.

A still further object of the invention is to provide a valve structure having the several features and characteristics set forth which is highly efficient in operation, and of relatively rugged and durable construction and operation thereby minimizing breakdowns, servicing and repair thereof.

These and other objects of the invention, and the various features and details of the construction and operation thereof, are hereinafter fully set forth and described with reference to the accompanying drawing, in which the single figure is a sectional view vertically through a valve embodying the present invention.

Referring now to the drawing, a valve made according to the present invention may comprise a valve body portion 1, having formed therein inlet and outlet passages 2 and 3, respectively, the inner ends of which communicate with one another through a valve port 4 provided with a valve seat 5 fitted therein. Arranged for cooperative engagement with the valve seat 5 to control fluid flow through the port 4 is a valve element 6 which is mounted at one end of a valve stem 7, having an enlarged head portion 8, that is in turn mounted for axial sliding movement in a bonnet 9 secured to the valve body 1, for example by bolts 10, a suitable sealing gasket 11 being provided between said valve body 1 and the bonnet 9 to provide a leak-proof joint therebetween. Suitable packing 12, held in position by a gland 13, surrounds the valve stem 7 in the bonnet 9 to prevent fluid leakage from the passage 3 outwardly between the said stem 7 and bonnet 9.

Secured upon the valve body 1, for example by bolts or the like 14, is a stanchion portion that is designated generally as 15, and secured upon said stanchion 15, for example by bolts 16, is a casing portion 17 which defines internally thereof a chamber 18 and a cylinder 19, respectively. The chamber 18 is adapted to contain air or other suitable fluid at a predetermined pressure supplied through a pipe 20.

Mounted within the cylinder 19 is a piston 21 having associated therewith suitable packing 22 held in place by means of a gland 23 which is secured to the upper end of the piston 21, for example, by bolts 24. The cylinder 19 and the pressure chamber 18 communicate with each other through an opening 25 therebetween so that the adjacent or upper end face of the piston 21 is subjected at all times to the fluid pressure in the chamber 18. The opening 25 between the chamber 18 and the cylinder 19 is of smaller diameter than said cylinder 19 as shown, thereby providing an inwardly extending flange portion 26 internally of the casing 17, which functions as a stop to limit upward movement of the piston 21. Movement of the piston 21 in the opposite or downward direction is limited by the upper end portion 27 of the stanchion 15 to which the casing portion 17 is secured as previously described.

The piston 21 comprises a guide portion 28 of reduced diameter that extends through an opening 29 in the adjacent end portion 27 of the stanchion 15 and projecting coaxially from said guide portion 28 is an elongated piston rod portion 30 of still smaller diameter which extends substantially to the adjacent head 8 of the valve stem 7 as shown. The piston guide portion 28 is provided with a key or lug 31 that engages slidably within a keyway or slot 32 formed in the stanchion end portion 27 to thereby prevent relative rotation of the piston 21 and piston rod 30 with respect to said stanchion 15 and the cylinder 19. It is to be noted that the construction and arrangement of the piston 21, piston rod 30, and the valve element 6 and its stem 7, is such that their several axes are disposed in coaxial relation with respect to one another.

The piston rod 30 is provided externally thereof with two sets of threads as indicated at 33 and 34 in the drawing. Engaging the threads 33 is a threaded control member 35 which is mounted for both sliding and rotational movement in a sleeve 36 that is in turn adjustably threaded as indicated at 37 in a central spider portion 38 of the stanchion 15. The control member 35 is provided at its upper end with an enlarged drum portion 39 of such diameter that it lies in the path of movement of the adjustable sleeve 36 which thereby serves as a stop to limit adjustment of the control member 35 in a downward direction. Engaging the threads 34 on the piston rod 30 for limited adjustment longitudinally of the latter above the control member is a member 40 which functions as an adjustable stop to limit adjustment of control member 35 in an upward direction. By reason of this construction, it will be apparent that by adjusting the positions of the sleeve 36 and member 40 axially with respect to one another and lengthwise of the piston rod 30, the range of permissible adjustment of the control member 35 relative to the piston rod 29 and head 8 of the stem 7 may be varied from time to time as required or desired.

Suitable means are provided for securing the sleeve 36 and member 40 against further rotation after adjustment thereof as described. Such means may comprise, for example, pins 41 and 42, respectively, slidably mounted in the portions 27 and 38 of the stanchion 15 and arranged to engage suitably formed slots or recesses 43 and 44, respectively, formed at predetermined intervals circumferentially of said sleeve 36 and member 40. The pins 41 and 42 normally may be urged into engagement with the associated slot or recess by means of springs 45 and 46, respectively, the said pins being provided with suitable handles 47 and 48, respectively, for withdrawing or disengaging the pins from said slots or recesses against the force of the springs acting thereon.

It will be observed that by rotating the control member 35 in one direction or the other to adjust the same axially of the piston rod 30 within the limits fixed the sleeve 36 and member 40, the position, or relative spacing, of the lower end of said member 35 with respect to the adjacent head 8 of the valve stem 7 may be adjusted and varied as required or desired, and for the purpose of facilitating such adjustment of the control member 35, the drum portion 39 thereof may be grooved to receive thereabout several turns of a cable 49 to be actuated, for example, from a remote point. Actuation of the cable 49 from a remote point may be accomplished by any suitable means such as a lever 50 to which is connected one end of the cable 49, the other end thereof being connected to a spring 51 anchored to a fixed support 52.

It is to be noted that the sets of threads 34 and 37 previously described, on which the member 40 and sleeve 36 are threaded, are quite fine so that rotational movement thereof between adjacent slots or recesses 44 and 43 thereon, respectively, will produce a relatively small adjustment of said sleeve and member in an axial direction. Conversely, the threads 33 on the piston rod 30 are, for example, of double Acme form, so that only a relatively small rotation of the control member 35 is required to traverse the limits determined by the settings of the sleeve 36 and member 40.

Formed coaxially in the upper face of the piston 21 is a smaller cylinder 53 in which is mounted a piston 54 provided with a suitable packing 55 held in place by means of a suitable gland 56. Extending from this piston 54 coaxially through the piston rod 30 of the piston 21 is a piston rod 57, the free end of which is adapted normally to engage the upper end face of the valve stem 7 as shown in the drawing. For purposes of lubrication of the pistons 21 and 54 and to provide an effective seal against dissipation of the fluid or air under pressure in the chamber 18, it is desirable that the chamber be partially filled with a suitable oil or like fluid. To this end, an oil inlet port 58 and drain port 59 are provided in the casing 17, and the latter preferably is filled with oil to the level of the said inlet port 58.

As shown in the drawing, and as in the case of the piston 21, the upper end face of the piston 54 is open, and, therefore, subjected to the fluid pressures within the chamber 18, and since the said piston 54 is of smaller diameter than the piston 21 the downward force exerted thereby under the influence of the pressure in the chamber 18 is substantially less than the downward force exerted by the larger piston 21. Conversely, the force necessary to actuate the larger piston 21 upwardly against the pressure in chamber 18 is substantially greater than the force required to actuate the smaller piston 54 in an upward direction.

As previously stated the sleeve 36 and member 40 are adjustable relative to one another to predeterminedly limit the range or extent of adjustment of the control member 35 axially of the piston rod 29 with respect to the valve stem 7, and while the sleeve 36 and member 40 generally are spaced apart at predetermined distance to permit of limited axial adjustment of the control member 35 lengthwise of the piston rod 30 and relative to the upper end of the stem 7, it will be apparent that said sleeve 36 and member 40 may be adjusted to positions engaging above and below the control member drum portion 39 to thereby lock the control member 35 against further adjustment and in a fixed position axially with respect to the piston rod 30.

Furthermore, it will be apparent that by suitable adjustment of the sleeve 36 and member 40, the control member 35 may be positioned axially lengthwise of the piston rod 30 so that the lower end of said control member 35 normally engages the head 8 of the valve stem 7 when the valve element 6 thereon is seated upon the valve seat 5. In this condition the valve element 6 is held closed to prevent fluid flow through the port 4 by the combined forces exerted upon the valve stem 7 by both the piston 21 and the piston 54 under the influence of the fluid pressure in the chamber 18.

In general, however, and as shown in the drawing, the sleeve member 36 is positioned so that the lower limit of adjustment of the control member 35, or the fixed position thereof depending upon the position of the member 40, is such that when the valve 6 is closed upon the valve seat 5 the lower end of said control member 35 is disposed in relatively spaced apart relation with respect to the head of the valve stem 7, with the result that the valve element 6 is held seated upon the valve seat 5 only by the force of the small piston 54 acting through its piston rod 57 which normally is in engagement with the valve stem 7. In these circumstances, the spacing of the control member 35 from the valve stem determines the extent or distance that the valve 6 may be opened against the action of the smaller piston 54 alone to establish a normal flow condition through the valve port 4, it being borne in mind that the amount of opening of valve 6, and hence the normal flow condition through port 4, may be varied by adjustment of the control member 35 relative to the valve stem 7 as previously described.

In addition to the foregoing construction, suitable means is provided for manually raising the valve stem 7 to open the valve element 6 with respect to its seat 5 to the limit provided by the setting or adjustment of the control member 35 as described. This may be accomplished, for example, by a lever 60 which is pivotally connected at one end thereof to a portion 61 of the stanchion 15 and provided with a raised or offset cam portion 62 arranged to engage cooperatively with the underside of the valve stem head 8 and upwardly actuate the stem 7 and valve element 6 when said lever is actuated manually in an upward direction as indicated by the arrow in the drawing.

In operation of a valve embodying the present invention, and assuming that the chamber 18 in the casing structure 17 is supplied with air at a predetermined pressure above the line fluid pressure at the inlet side of the valve element 6 so that the latter is closed upon its seat 5, the valve element 6 will remain closed to prevent fluid flow from the inlet passage 2 through valve port 4 to the outlet passage 3 until the fluid pressure at the inlet side of the valve 6 is increased or built up to a pressure slightly in excess of the closing force exerted upon the valve 6 by the piston 54 and its rod 57 under the influence of the air pressure in the chamber 18. When the line fluid pressure at the inlet side of the valve 6 slightly exceeds the valve closing force exerted by the piston 54 as described, the valve element 6 and its stem 7 will be actuated upwardly, together with the piston rod 57 and piston 54, against the pressure head within the chamber 18 thereby initially opening the valve 6 with respect to its seat 5 to permit fluid to flow from the passage 2 through port 4 to the outlet passage 3. As the line fluid pressure increases the valve element 6 will continue to be actuated upwardly until the head 8 of the valve stem 7 is brought into abutting engagement with the lower end of the control member 35. At this position of the valve a condition of maximum fluid flow through the port 4 at normal operating pressures is established.

As previously stated the force exerted by the large piston 21 under the influence of the pressure in the chamber 18 is substantially greater than the valve closing force exerted by the smaller piston 54, and hence the control member 35 which is associated with the piston 21 will function to limit the extent of opening of the valve opening element 6 so long as the line fluid pressure does not exceed the force exerted by the piston 21 under the influence of the pressure in the chamber 18.

At the termination of each particular operation of a fluid system containing a valve structure embodying the present invention, the line fluid pressures at the inlet side of the valve drop off substantially with the result that the piston 54 operates in response to the pressure in the chamber 18 to reseat or close the valve element 6 upon its seat 5 and prevent further flow of fluid through the port 4. Under these circumstances, a return flow of the line fluid through the valve may be effected by manually actuating the lever 60 to open the valve element 6 with respect to its seat 5 as hereinbefore described.

Apart from the foregoing, under abnormal operating conditions should the pressure of the line fluid at the inlet side of the valve 6 increase to an excessive degree so that it exceeds the downward force exerted by the piston 21 under the influence of the pressure in the chamber 18, the valve 6 and its stem 7, together with the control member 35, piston rod 30 and piston 21, will be further actuated upwardly carrying therewith the piston 54 and its rod 57 against the pressure head within the chamber 18 that is acting upon both of the said pistons 21 and 54 to thereby relieve such excessive fluid pressures, and continued increase in the line fluid pressure, above the combined forces exerted by the pistons 21 and 54 under the influence of the pressure in the chamber 18 to the extent limited by the flange 26. It is to be noted that flange 26 is positioned to provide a stroke for the piston 21 sufficient to allow the valve element 6 to open with respect to its valve seat 5 under excessive abnormal pressures, a distance that will permit maximum rate of fluid flow through the port 4 under maximum line fluid pressures existing at the inlet side of the valve.

From the foregoing, it will be apparent that the present invention provides a novel valve structure that is operable effectively both to control fluid flow through a fluid system at normal operating pressures and to provide for the relief of excessive pressures under abnormal conditions. The invention also provides a novel valve structure having pressure controlled means operable to limit opening of the valve element a predetermined distance to establish a condition of fluid flow therethrough at desired normal operating pressures. The invention further provides a valve structure wherein the extent of opening of the valve element for normal flow conditions may be varied and adjusted as desired within predetermined limits, and wherein the limits and extent of adjustment of the opening of the valve for normal flow conditions in turn may be fixed and adjusted as desired. In addition, the present invention provides a valve structure having means operable manually to open the valve a predetermined distance to effect fluid flow therethrough in a reverse direction.

While a particular embodiment of the present invention has been illustrated and described herein, it is not intended that the invention be limited to such disclosure, and changes and modifications may be made therein and thereto within the scope of the claims.

The invention described herein may be manufactured and used by or for the Government of the United States of America for governmental purposes without the payment of any royalties thereon or therefor.

I claim:

1. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, and a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures.

2. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures, and control means associated with said second means adjustable to vary the limit to which said valve element is actuable to open position for fluid flow at said normal operating pressure of the system.

3. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures, control means associated with said second means adjustable to vary the limit to which said valve element is actuable to open position for fluid flow at said normal operating pressures of the system.

4. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures, and control means associated with said second means adjustable at will to vary within predetermined limits the limit to which said valve element is actuable to open position for fluid flow at said normal operating pressures of the system.

5. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures, control means associated with said second means adjustable at will to vary within predetermined limits the limit to which said valve element is actuable to open position for fluid flow at said normal operating pressures of the system, and adjustable means operable at will to predeterminedly fix the limits and extent of adjustment of said control means.

6. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures, control means associated with said second means adjustable at will to vary within predetermined limits the limit to which said valve element is actuable to open position for fluid flow at said normal operating pressures of the system, adjustable means operable at will to predeterminedly fix the limits and extent of adjustment of said control means, and means to secure said adjustable means in the positions to which adjusted.

7. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures, control means associated with said second means adjustable at will to vary within predetermined limits the limit to which said valve element is actuable to open position for fluid flow at said normal operating pressures of the system, means manually operable to adjust said control means.

8. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures, control means associated with said second means adjustable at will to vary within predetermined limits the limit to which said valve element is actuable to open position for fluid flow at said normal operating pressures of the system.

9. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures, and manual means operable to actuate said valve element and said first means against the pressure in said chamber to open said valve element to permit fluid flow through the valve.

10. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to limit opening of said valve element for maximum fluid flow at normal operating pressures of the system, said second means being actuable against the pressure in said chamber by inlet fluid pressures in excess of the range of normal operating pressures of the system to further open said valve element and thereby relieve said excess pressures, manual means operable to actuate said valve element and said first means against the pressure in said chamber to open said valve element and effect fluid flow through the valve, and control means associated with said second means adjustable to vary the limit to which said valve element is actuable to open position both in response to normal operating pressures in the system and by operation of said manual means.

11. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures, manual means operable to actuate said valve element and said first means against the pressure in said chamber to open said valve element and effect fluid flow through the valve, and control means associated with said second means adjustable to vary the limit to which said valve element is actuable to open position, both in response to normal operating pressures in the system and by operation of said manual means, and 12. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures, manual means operable to actuate said valve element and said first means against the pressure in said chamber to open said valve element and effect fluid flow through the valve, and control means associated with said second means adjustable to vary the limit to which said valve element is actuable to open position both in response to normal operating pressures in the system and by operation of said manual means, and adjustable means operable at will to predeterminedly fix the limits and extent of adjustment of said control means.

13. In a valve structure having an inlet and an outlet for connection in a fluid system, a valve element to control fluid flow between said inlet and outlet, a chamber to contain an independent fluid under predetermined pressure, a first means responsive to the fluid pressure in said chamber operable normally to maintain said valve element closed and prevent fluid flow between said inlet and outlet, said first means being actuable against the pressure in said chamber by a predetermined fluid pressure at the inlet side of said valve element to open the latter and establish fluid flow through the valve from the inlet to the outlet within the range of desired normal operating pressures of the system, a second means responsive to the fluid pressure in said chamber exerting an effective force substantially greater than said first means and operable normally to predeterminedly limit the extent of opening of said valve element for fluid flow at normal operating pressures of the system, said second means being actuable against the pressure in said chamber by inlet fluid pressures in excess of the range of normal operating pressures of the system to further open said valve element and thereby relieve said excess pressures, manual means operable to actuate said valve element and said first means against the pressure in said chamber to open said valve element and effect fluid flow through the valve, and control means associated with said second means adjustable to vary the limit to which said valve element is actuable to open position both in response to normal operating pressures in the system and by operation of said manual means, means manually operable to adjust said control means, adjustable means operable to predeterminedly fix the limits and extent of adjustment of said control means, and means to secure said adjustable means in the positions to which adjusted.

MARVIN O. YOUNG.

REFERENCES CITED

The following references are of record in the file of this patent:

UNITED STATES PATENTS

| Number | Name | Date |
|---|---|---|
| 234,264 | Forbes | Nov. 9, 1880 |
| 1,676,999 | Mobley | July 10, 1928 |
| 1,400,411 | Booth | Dec. 13, 1921 |